(12) United States Patent
Sanders et al.

(10) Patent No.: US 7,508,354 B1
(45) Date of Patent: Mar. 24, 2009

(54) MULTI-BOARD PRESENTATION SYSTEM

(75) Inventors: Daniel P. Sanders, Indianapolis, IN (US); David Berque, Greencastle, IN (US); Jason A. Geringer, Indianapolis, IN (US)

(73) Assignee: Dynamic Knowledge Transfer, LLC, Indianapolis, IN (US)

( * ) Notice: Subject to any disclaimer, the term of this patent is extended or adjusted under 35 U.S.C. 154(b) by 474 days.

(21) Appl. No.: 11/017,400

(22) Filed: Dec. 20, 2004

(51) Int. Cl.
*G09G 5/00* (2006.01)

(52) U.S. Cl. .................. 345/1.1; 434/350; 434/362

(58) Field of Classification Search .................. 345/1.1; 434/350, 362
See application file for complete search history.

(56) References Cited

U.S. PATENT DOCUMENTS

| | | |
|---|---|---|
| 4,616,336 A | 10/1986 | Robertson et al. |
| 4,716,404 A | 12/1987 | Tabata et al. |
| 5,146,552 A | 9/1992 | Cassorla et al. |
| 5,176,520 A | 1/1993 | Hamilton |
| 5,211,564 A | 5/1993 | Martinez et al. |
| 5,231,578 A | 7/1993 | Levin et al. |
| 5,239,466 A | 8/1993 | Morgan et al. |
| 5,274,362 A | 12/1993 | Potvin |
| 5,800,181 A | 9/1998 | Heinlein et al. |
| 5,816,820 A | 10/1998 | Heinz et al. |
| 5,823,788 A | 10/1998 | Lemelson et al. |
| 5,903,252 A | 5/1999 | Ogata |
| 6,008,800 A | 12/1999 | Pryor |
| 6,038,684 A | 3/2000 | Liddell et al. |
| 6,078,920 A | 6/2000 | Tan et al. |
| 6,141,000 A | 10/2000 | Martin |
| 6,141,529 A | 10/2000 | Remschel |

(Continued)

OTHER PUBLICATIONS

D. Berque, "Electronic Blackboards: A Vision of the Future," *The Tenth International Conference on Technology and Education*, Massachusetts Institute of Technology, Mar. 21-24, 1993, pp. 340-342.

(Continued)

*Primary Examiner*—Richard Hjerpe
*Assistant Examiner*—Leonid Shapiro
(74) *Attorney, Agent, or Firm*—William F. Bahret

(57) ABSTRACT

A multi-board presentation system has a plurality of interactive boards connected to and controlled by separate computers that are in communication with one another through a server. The multi-board system utilizes a multi-machine interface that runs concurrently on each interactive board/computer providing heterogeneous input and output capabilities. Each interactive board may be assigned or associated with an offset value that allows for various schemes of display of panels of content on the different interactive boards. Such schemes may be operated manually by a moderator or automatically via the system. A portable interactive tablet may be part of the multi-board system which interfaces with the plurality of interactive boards through the server. The present multi-board system may also include a plurality of interactive participant tablets that are in communication with the array of interactive boards. Each interactive user tablet allows the participant to select which panel of content to display on their interactive tablet. Each interactive participant tablet allows the participant to synchronize display of one or panels of content thereon as displayed on one or more of the interactive boards. Moreover, each interactive participant tablet accepts participant input that is displayable on an interactive board displaying the same panel of content, with the participant input optionally being masked or obscured.

12 Claims, 13 Drawing Sheets

U.S. PATENT DOCUMENTS

| | | | |
|---|---|---|---|
| 6,148,174 | A | 11/2000 | Remschel |
| 6,151,621 | A | 11/2000 | Colyer et al. |
| 6,154,631 | A | 11/2000 | Remschel |
| 6,160,987 | A | 12/2000 | Ho et al. |
| 6,885,844 | B2 * | 4/2005 | Roschelle et al. .......... 434/350 |
| 7,213,211 | B1 | 5/2007 | Sanders et al. |
| 2002/0101445 | A1 | 8/2002 | Berque |

OTHER PUBLICATIONS

D. Berque et al., "On the Progress of Developing Groupware to Support Notetaking," *Second Annual International Conference on the Learning Sciences*, Northwestern University, Evanston, Illinois, Jul. 25-27, 1996, pp. 345-350.

D. Berque et al., "Electronic Classrooms: A Prototype Using Laser Whiteboards and Pen Based Computers," *The Fourteenth International Conference on Technology and Education*, Oslo, Norway, Proceedings vol. 1, Aug. 10-13, 1997, pp. 231-233.

D. Berque et al., "Using a Variation of the WYSIWIS Shared Drawing Surface Paradigm to Support Electronic Classrooms," *Proceedings of Human-Computer Interaction '99, 8th International Conference of Human Computer Interaction*, Munich Germany, Aug. 22-27, 1999 (2 pages).

D. Berque et al., "The Design of an Interface for Student Note Annotation in an Networked Electronic Classroom," *Journal of Network and Computer Applications*, vol. 23, No. 2, Apr. 2000, pp. 77-91.

D. Berque et al., "Teaching Theory of Computation Using Pen-Based Computers and an Electronic Whiteboard," *Proceedings of ITiCSE 2001, 6th Annual Conference on Innovation and Technology in Computer Science Education*, Canterbury, England, Jun. 25-27, 2001, pp. 169-172.

D. Berque et al., "Changing Places: A Case Study in Adapting an Education Pen-based System for use at a Distance," *World Conference on Educational Multimedia, Hypermedia and Telecommunications*, Denver, Colorado, Jun. 24-29, 2002 (6 pages).

T. Sakurada et al., "Extension of the IdeaBoard for Educational Applications," *Proceedings of HCI International(the 8th International Conference on Human-Computer Interaction) on Human-Computer Interaction: Ergonomics and User Interfaces*, 1999. vol. 1, pp. 213-217.

M. Nakagawa et al., "A Revised Human Interface and Educational Applications on IdeaBoard," *Conference on Human Factors in Computing Systems*, May 15-20, 1999, pp. 15-16.

B. Myers, "Using Handhelds and PCs Together," *Communications of the ACM*, vol. 44, No. 11, Nov. 2001, pp. 34-41.

E. Hamilton, "Remote Sharing of Electronic Paper (SlateMate)," *Proceedings of the Tenth International Conference on Technology and Education*, Massachusetts Institute of Technology, Mar. 21-24, 1993, pp. 1068-1070.

Ishii et al., "Toward An Open Shared Workspace: Computer and Video Fusion Approach of Teamworkstation," *Communications of the ACM*, vol. 34, No. 12, Dec. 1991, pp. 37-50.

L. Anderson, "'Noteless' Classroom of the Future Technology Makes Teaching and Learning More Personal," *DePauw Magazine* [online], Spring 2004 (4 pages) [retrieved Dec. 21, 2000]. Retrieved from the Internet: <http://www.depauw.edu/pa/magazine/spring2000/news/debbie.asp>.

Product literature, SMART Board™ Interactive Whiteboard, SMART Technologies, Inc., © 2003 (2 pages).

* cited by examiner

DyKnow Multi-Board Launcher

| Board Order | In Use? | Machine Name or Address | Master? | Panel Offset |
|---|---|---|---|---|
| 1 | ☑ | 163.120.14.43 | ○ | -2 |
| 2 | ☑ | 163.120.14.42 | ○ | -1 |
| 3 | ☑ | 163.120.14.11 | ○ | 0 |
| 4 | ☑ | 163.120.14.41 | ○ | -1 |
| 5 | ☑ | 163.120.14.40 | ○ | -2 |
| 6 | ☐ | | ○ | 0 |
| 7 | ☐ | | ○ | 0 |
| 8 | ☐ | | ○ | 0 |
| 9 | ☐ | | ○ | 0 |
| 10 | ☐ | | ○ | 0 |
| 11 | ☐ | | ○ | 0 |
| 12 | ☐ | | ○ | 0 |

Tabs: Sign On | Communications Configuration | Launch | Board Configuration

[Apply Changes]

*Fig. 9*

MULTI-BOARD PRESENTATION SYSTEM

BACKGROUND OF THE INVENTION

The present invention relates generally to multi-board input and display systems.

Pen-based electronic systems, especially suited for classroom or learning environments, have been in use for several years. These pen-based electronic systems utilize a large touch-sensitive electronic whiteboard or similarly functioning board that is usually located at a strategic vantage point for viewing by the entire audience (e.g. at the front of the room). A user such as a moderator writes on the board and this board may thus be considered a moderator workstation. The pen-based electronic system may additionally include a pen-based video tablet or similar device for each board. A video tablet is an input and display device that does not communicate directly with a board. The board and video tablet are both connected to a single computer. The computer mirrors its output so that the output of the computer is displayed on both the video tablet and the board.

Other users of the system also have workstations augmented with video tablets. These users can use their electronic pens to make private annotations on the copy of the board material that is presented on a workspace on their pen-based video tablet. Users can also submit portions of their workspace, for example containing a solution to a problem that was worked out during instruction, to a teacher who can display this material on the board for the entire class to view and discuss. Such hardware as discussed above for the implementation of the described features is driven by what is known as groupware. Groupware is software that supports cooperative work by providing a shared work surface for two or more users. Such a system is described in U.S. patent application Ser. No. 10/689,804 by David Berque and Daniel P. Sanders entitled System For Knowledge Transfer In A Group Setting, filed Oct. 20, 2003 and its parent application, U.S. Patent Application Publication 2002/0100445 A1 (Ser. No. 09/899,431), both of which applications are specifically incorporated herein by reference.

The pen-based electronic system described above provides a shared drawing surface paradigm that differs in an important manner from a typical "WYSIWIS" (What You See Is What I See) paradigm common to typical groupware. With the above-cited pen-based system, drawing actions made by a moderator on a moderator workstation (the whiteboard) are immediately transmitted to all of the participants' workstations via a session server while the drawing actions of the participants on their workstation are not transferred to the moderator's workstation. This is because the participants' drawing actions are considered to be private. In view of this, the moderator generally has no awareness of participant drawing actions unless the moderator chooses to display a particular participant's work.

The lack of moderator awareness of participant drawing actions would appear to be a benign event. However, the lack of moderator awareness of participant drawing actions can lead to a problem that may be referred to as a collision problem. The collision problem results when the moderator adds public material to the shared drawing surface in such a manner that this material collides with private annotations that have been previously written by one or more participants. In practice, this problem is exacerbated by the fact that participants are allowed to make private annotations to the moderator's dynamically changing public material. Allowing private annotations, however, is considered an important feature, as evidenced from actual classroom experience with such systems. Particularly, allowing this type of annotation is an important feature because moderators typically draw a sketch, discuss it, enhance the sketch, and then discuss it some more. Because of this alternating pattern, it is not desirable to force the participants to annotate only frozen snapshots of the moderator's material. Rather, it is important for the participants to be able to interactively annotate the moderator's notes as they evolve.

There has been considerable prior work on supporting the private annotation of static documents such as web pages. However, this work is not directly applicable to the problem at hand due to the dynamic nature of the public content that students need to annotate. In view of this, there has been some prior work in the area of coping with collision type problems for dynamic displays in the context of so called "single display groupware systems." This paradigm is characterized by two or more co-located users, each with his/her own input device, interacting using a single shared display. When interacting using a single display, it is possible for the actions of one user (for example, raising a menu) to interfere with the actions of another user. The use of translucent interface components has been explored as a solution to the collision problem. Another approach is the use of shutter glasses to allow a pair of users to make private annotations to public content in the context of single display groupware. This work, however, is limited to supporting a pair of users and is most applicable in the context of single display groupware.

Collision strategies for coping with the collision problem can be divided into two broad categories: collision correction and collision avoidance. The collision correction approach assumes collisions will occur and provides mechanisms for correcting the collisions after the fact. For example, the system might allow each participant to toggle between three separate view modes: one in which only the moderator's material is displayed, one in which only that participant's material is displayed, and one in which both sets of material are displayed. The latter view might display a collision, but by toggling between the other views the student can determine the true contents of the shared work surface. Alternatively, similar to the ideas explored for collision correction solutions, the system might display annotations using translucent ink. These approaches have the disadvantages, however, of not being applicable to a printed version of the electronic notebook. A more elaborate collision resolution strategy provides the students with the ability to select and relocate some or all of the private annotations that are colliding with material drawn by the teacher. However, this technique fails in many contexts because changing the location of a private annotation may destroy its meaning.

An alternative to the collision correction strategies are collision avoidance strategies. These strategies require the provision of facilities in the system that help users avoid collisions in the first place. A simple, and perhaps the simplest, collision avoidance strategy is to provide each participant with a private margin or window separate from the shared work surface, and to require that all private annotations take place in this private area. There are several limitations associated with restricting student annotations to a private area in the WYSIWIS paradigm. First, forcing the participants to write in a separate margin or window restricts their ability to associate their annotations with the relevant public material. This can be mitigated to some extent by allowing the participants to place hyperlinks between their marginal notes and the relevant public material. Experience shows, however, that participants hardly use this feature, preferring instead to take notes directly on the moderator's public material even with the risk of collision.

With the current pen-based electronic systems, a single whiteboard of limited size (e.g. 5'W×4'H) is somewhat constraining for the typical instructor who is used to having twenty (20) feet or more of board space in a typical classroom. This typically does not allow for more than one student's work (from his or her workstation) to be displayed at one time on the single whiteboard. Additionally, the current pen-based electronic systems do not allow for instructor mobility. The instructor is limited in mobility because he/she must stay at the single whiteboard for providing written input into the system and for control of the system. If the instructor sees an interesting student solution while walking the classroom, the instructor must return to the whiteboard in order to display the student's work. This is a time-consuming procedure that leads to frustration on the part of the instructor.

What is therefore needed is a multi-board input and display system that alleviates the shortcomings of the prior art.

What is therefore further needed is a multi-board input and display system that provides mobility to a moderator of the system while allowing input, display and control of the system.

SUMMARY OF THE INVENTION

A multi-board presentation system according to one aspect of the present invention includes a server and a plurality of computer-enabled display devices in communication with the server. Board programming provides control of each computer-enabled display device and allows designation of a master or moderator computer-enabled display device. The master computer-enabled display device defines a reference panel from which other computer-enabled display devices determine a panel to display. The server receives, coordinates and provides interactive device and panel commands and session data to and from the computer-enabled display devices.

One of the computer-enabled display devices may be a computer-enabled interactive device that accepts input from a user. The presentation system in accordance with this aspect of the invention utilizes multi-display interface software that runs concurrently on each display device and the server providing heterogeneous input and output capabilities. The server provides a central communication interface between the display devices, with each display device operable to display one or more panels of a presentation session notebook. Each display device is controlled so as to display the same or different panels of content of a session notebook, particularly relative to the display of one or panels on a master display device.

According to one form of the invention, various panel presentation schemes may be implemented using the plurality of computer-enabled display devices. An exemplary panel presentation scheme utilizes a designated master computer-enabled display device. Panel presentation on non-master computer enabled display devices, including panel change, is performed relative to a panel on the master computer-enabled device.

According to an implementation of the present invention, each one of the computer-enabled display devices is an interactive board. Thus, each interactive board is unique within the multi-board system by the combination of two values. One value is an index, while the other value is an offset. The index of an interactive board is the order in which an interactive board is physically arranged in relationship to the other interactive boards. The index also directly corresponds to the order in which synchronization buttons are displayed on participant workstations. The offset of an interactive board determines which panel will be displayed. An offset of zero (0) makes an interactive board a master board. A master board is an interactive board from which non-master interactive boards calculate which panel to display in conjunction with the offset of the non-master board. Panel navigation on a master interactive board causes a board synchronization signal to be supplied to other interactive boards, as well as to participant workstations, if any. A board synchronization signal tells every non-master interactive board and/or workstation the new panel number being displayed on the master board in order to adjust or change the panel being displayed on the workstation or non-master board.

The offset allows for various panel display schemes relative to one or more of the interactive boards. The display scheme may be automatic or manual. According to one offset scheme, a master interactive board displays a current panel, while right and left immediately flanking interactive boards display a panel previously displayed on the master interactive board. As new panels are displayed on the master interactive board, the old displayed panels are successively moved outwardly for display on outer interactive boards.

In another form of the invention, a portable interactive (input and display) device may be part of the multi-board system. The portable interactive device concurrently utilizes a component of the multi-machine interface, thus running and displaying its own copy of an input and display program. The portable interactive board serves as a master interactive board within the multi-board system and also has an index of zero (0). Because the index is zero (0), the portable interactive device will not present a synchronization button to a session for participant workstations to synchronize to its panel.

The portable interactive device provides the user mobility during use of the present multi-board system. The portable interactive device incorporates an interactive tablet that wirelessly interfaces with the multi-boards and allows the user thereof to control the multiple boards of the multi-board system while moving throughout a room.

In another form of the invention, the present multi-board presentation system may also include a plurality of electronic participant interactive (input and display) devices, tablets, laptops or boards that are in communication with the interactive boards, through the multi-board network and server of the system. Each interactive participant tablet runs the interface program of the multi-machine interface. The interface program allows the participant to select which panel of content to display on the interactive tablet. The participant interface program also allows the user to synchronize display of panels on the interactive tablet as displayed on one or more of the array of interactive boards.

In such an embodiment, each interactive tablet is also operable to allow the participant to input hand-written content via a writing tool directly on a panel being displayed on the tablet. This hand-written content may optionally be displayed on any interactive board displaying the particular panel. The hand-written user content may, if displayed, optionally be displayed on the interactive board in an obscured, masked or shadowed state in order to hide the exact content of the hand-written content, but indicate its position relative to the moderator's input. Various characteristics of such obscuring, masking or shadowing such as color and shape are optionally changeable.

A participant of an interactive tablet may also reserve space on a panel being displayed on the interactive tablet for participant input. The reservation of space may also optionally be displayed on the corresponding panel of content being concurrently displayed on one or more of the interactive boards.

A collection of panels or individual writing spaces or pages of content of a session constitutes a notebook. A session is a shared notebook between a moderator and participants.

The objects and advantages of the present invention will be more apparent upon reading the following detailed description in conjunction with the accompanying drawings.

BRIEF DESCRIPTION OF THE DRAWINGS

FIG. 9 is a representation of an exemplary system control screen in accordance with the principles of the subject invention.

Like reference numerals indicate the same or similar parts throughout the several figures.

DETAILED DESCRIPTION OF PREFERRED EMBODIMENTS

Figure 1:
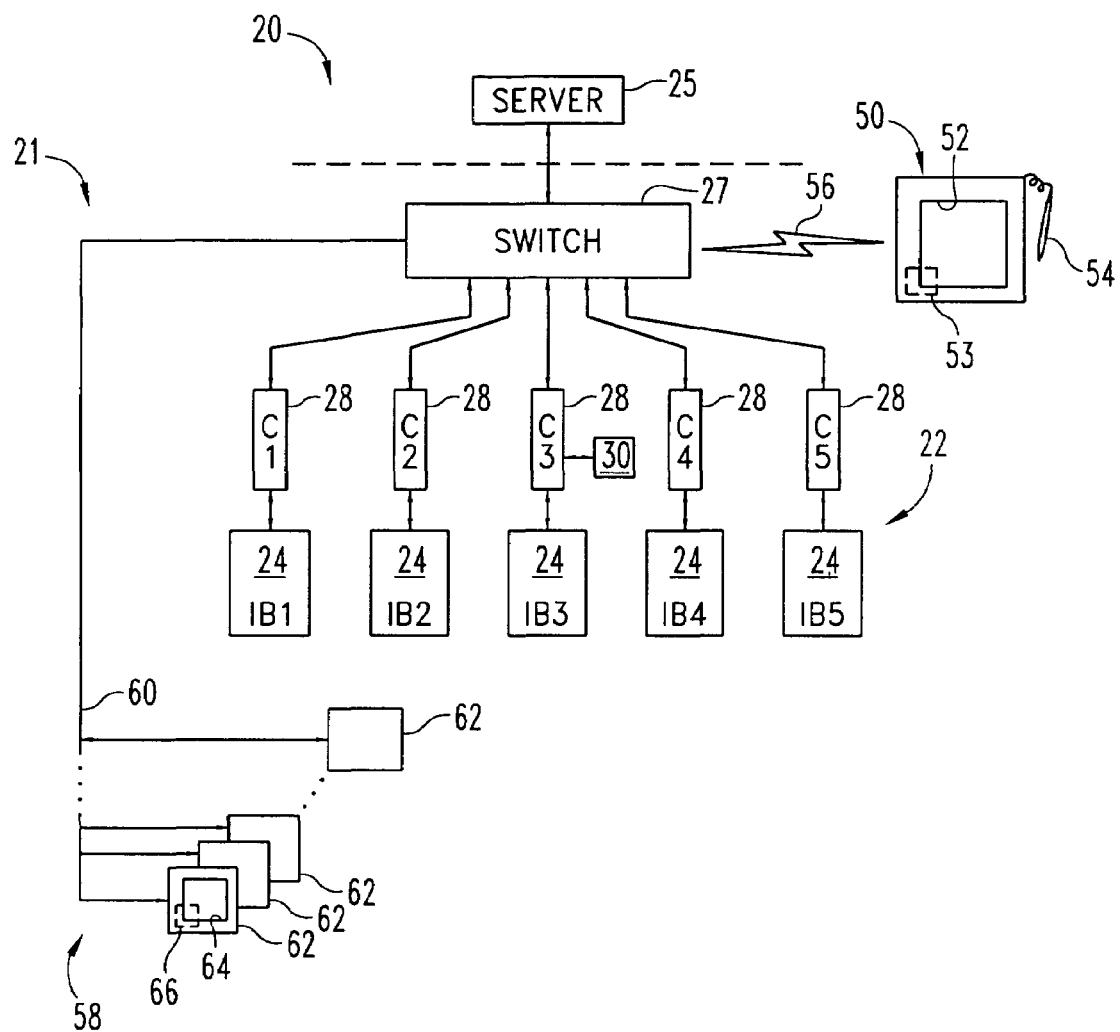
FIG. 1 is a representation of an exemplary architecture of a multi-board system in accordance with the principles of the present invention.

For the purpose of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device and such further applications of the principles of the invention as illustrated therein being contemplated as would normally occur to one skilled in the art to which the invention relates.

FIG. 1 depicts a block diagram of an exemplary multi-board presentation system, generally designated 20, in accordance with the present principles. Multi-board system 20 is an electronic, preferably computer or controller-based, input and display system that has multiple uses depending on its mode of operation and configuration. Multi-board system 20 is interactive, in that it is operable, configured and/or adapted to display content, accept or allow input of content, display the inputted content, and/or store the content in various forms. Such input may be provided in a variety of ways as described herein. As well, the display of information inputted into multi-board system 20 may be provided in a variety of ways as described herein. Multi-board system 20 includes an interactive board subsystem 21 and a participant subsystem 58 as further described below. Each subsystem may function as an overall system without the other subsystems, or may function in conjunction with one or more subsystems.

It should be appreciated that the multi-board presentation system 20 and any other embodiments of the present invention is particularly useful in a classroom setting where a teacher, instructor, professor or the like ("moderator"—or the person overseeing the system) is utilizing the multiple interactive boards as traditional chalkboards, white boards, or overhead projection systems. In this setting, the multiple interactive boards 24 would be situated at the front of a classroom with students all around. Typically, the center board is the focus of the classroom. The present system 20 is also applicable to business settings and anywhere else wherein information is to be inputted and displayed.

Multi-board system 20 includes a multi-board display or array of boards 22 composed of a plurality of individual input and display boards 24. The input and display, hence interactive boards 24, are preferably, but not necessarily, all of the same type as described below. The interactive boards (IBs) are labeled IB3, IB2, IB3, IB4 and IB5. The numeric designation of the interactive boards is arbitrary, as the interactive boards 24 function in the manner specified herein regardless of their numeric designation in the figures unless otherwise indicated. In the configuration depicted in FIG. 1, each interactive board IB1-IB5 is connected to a separate computer or controller 28 respectively labeled C1, C2, C3, C4 and C5 each one of which is adapted, operable and/or configured to execute interactive board control programming in accordance with the present principles. The board programming allows for operation of the interactive boards as provided herein. In an alternative embodiment, multiple interactive boards can be connected to a single computer with the single computer adapted, operable and/or configured to execute interactive board control programming for each interactive board as described herein.

Each computer C1-C5 provides control of its respective interactive board IB1-IB5. The computers C1-C5 may be physically separate from its respective board as shown, or may be integral with its respective board. Each computer C1-C5 is connected to a switch, hub, router or the like 27 and from there to a server 25 to form a network, e.g., an Ethernet local area network (LAN). The server may be physically located proximate to the interactive boards, such as in the same room, or may be remote from the interactive boards, as depicted here by the dashed horizontal line, such as in a different room, building or geographic location.

Each computer C1-C5 and the server 25 stores and runs a copy of the multi-board groupware or interface software described herein. Particularly, the server 25 serves as a main "traffic controller" for a session that receives various commands and/or data from one or more of the interactive boards IB1-IB5 and queues the various commands and/or data for dissemination to and/or use by one or more of the interactive boards IB1-IB5. The queued commands and/or data are also used by other devices of the system 20 as described below. The server may also receive various commands and/or data from the other devices as described below. A board computer, however, may be used as a session server, thereby alleviating the need for a server in the system 20. The switch may be an Ethernet switch and thus each computer C1-C5 includes an appropriate Ethernet interface. In the architecture of the multi-board system 20 of FIG. 1, the server 25 is in communication with each interactive board 24 via its respective computer C1-C5 through the multi-board network including switch 27. The server 25 runs a session component or programming to control a session (i.e. a multi-board session).

Each interactive board/board computer or controller combination (IB1/C1, IB2/C2, IB3/C3, IB4/C4 and IB5/C5) runs a controller/computer-enabled input and display (interactive) board. One of the computers (C1-C5) may act as a session server. Not shown in FIG. 1, but optionally, each computer-enabled interactive board includes a separate monitor, respectively corresponding to monitors M1-M5), an input device, respectively corresponding to input devices (ID1-ID5). The input device may be a mouse, keyboard, touch screen or the like. In this manner, a user may monitor the contents of an interactive board and provide direct input. As an alternative configuration to this optional configuration, a single monitor (M) and a single input device (ID) may be selectively connected to each computer-enabled interactive device (IB1/C1, IB2/C2, IB3/C3, IB4/C4 and IB5/C5) through a KVM connection or the like. This provides a central monitoring station for a moderator.

The multi-machine interface programming provides interactive board programming that presents or displays a file or notebook on the interactive board. The program allows the display of the notebook as pages or panels of content. The system may allow any number of pages or panels dependent only on system parameters.

Preferably, each one of the interactive boards is the same type of interactive board. Moreover, each interactive board is preferably an input and display board that is operable to display content and accept or allow input thereon. Several exemplary types of interactive boards that are capable of being used herein are 1) a rear-projection monitor system with a built-in touch-enabled surface, model 1810, available from SMART Technologies, Inc. of Calgary, Canada; 2) a flat-panel overlay touch-enabled surface that mounts over a flat-panel display, also from SMART Technologies, Inc.; and 3) an interactive, touch-enabled whiteboard for use with a front projection system, model 540, also from SMART Technologies.

It should be appreciated that while five (5) input and display boards 24 are depicted for the multi-board display or array 22, the multi-board display 22 may have more than or less five display boards 24 of various dimensions. It should thus be appreciated that the present system is scalable to any number of interactive boards.

The system 20 may, and preferably does, include a portable or walkabout interactive device 50 that is described in greater detail below. In summary, though, the portable interactive device 50 includes an input area 52 (such as a pen-enabled or otherwise touch-sensitive technology area) and a processor/wireless interface 53. The wireless interface 53 portion provides communication with the switch 27 (to the system network) via a wireless switch or peripheral device in communication with the switch (not shown). The portable device 50 is as master board (i.e. has an offset of "0" and an index of "0"). The portable device includes an input device such as a pen 54 that would interact with the input area 52 thereof. Other types of touch-sensitive or touch-screen-enabled devices may be used if desired.

Figure 2:
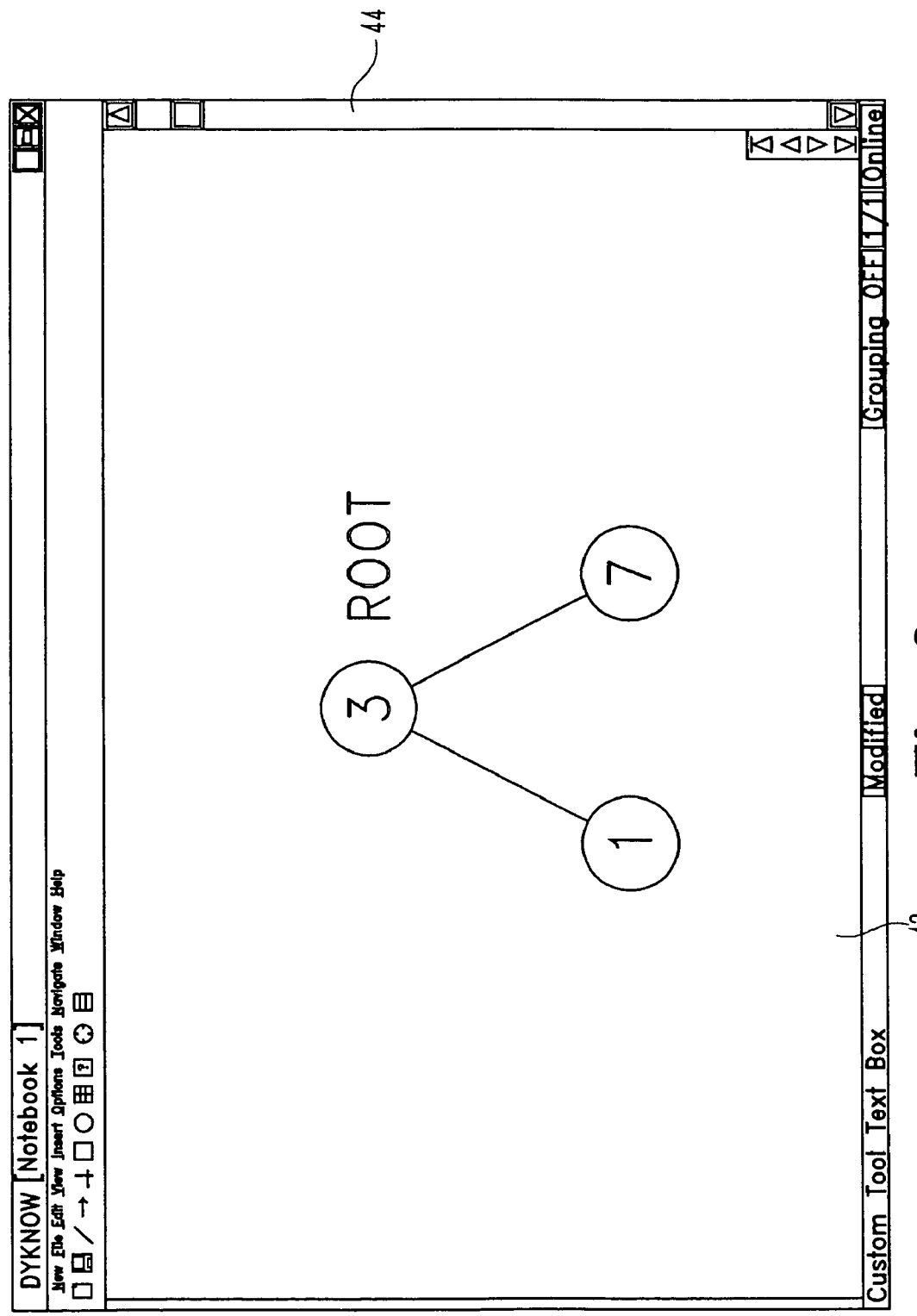
FIG. 2 is view of an exemplary interactive (input and display) program screen of the multi-machine interface of the present invention.

Input into the multi-board system 20 may be accomplished in several manners. Input may be received via one or more of the electronic input and display boards IB1, IB2, IB3, IB4 or IB5, or as explained further below, via the portable device 50. The interface software provides a typical "Windows" type input screen onto which the moderator provides input with respect to the interactive boards as well as the display of panels of a notebook of a session, both previously stored panels and current panels of a notebook. The interface software thus allows the moderator to provide input as pages or panels of information with respect to a notebook of panels. FIG. 2 shows an exemplary interface component screen for displaying a particular notebook, generally designated 40, of a session. The input and display component 40 includes the typical "Windows" type of controls. Additionally, the component 40 includes an area 42 that displays a particular page or panel of content of the active or session notebook and on which the moderator may input or write information or content via a writing tool. A tree structure is shown in the area 42. A scroll bar 44 is provided that allows the user to scroll to next and previous panels of content for display. Scroll keys or other manners of scrolling the panels may be provided.

The panels of information are displayed on one or more of the interactive boards 24. The moderator may thus choose to input information directly onto any one of the interactive boards IB1, IB2, IB3, IB4 or IB5 and control the display of panels on the interactive boards IB1, IB2, IB3, IB4 or IB5 from any one of the interactive boards IB1, IB2, IB3, IB4 or IB5 via the notebook 40.

The moderator can adjust each of the interactive boards to display any panel number independent of the other interactive boards. For example, the moderator might set the left most interactive board IB1 to display panel number 1, the next interactive board IB2 to display panel number 2, the next interactive board IB3 to display panel number 3, etc. It is also possible for one or more interactive boards to be displaying the same panel number. For example, if the moderator positions each of the five interactive boards so that they are all displaying panel number 1, then anything the moderator writes on one of the boards, will also be displayed immediately on all of the interactive boards, since they are all displaying the same panel.

Each interactive board 24 has an index (index value or number). The index may be any positive integer or zero. The number or value of the index of a board corresponds to the order in which the boards are situated (i.e. the physical order of board arrangement). By way of example, in FIG. 3, the five boards IB1, IB2, IB3, IB4 and IB5 are depicted. The index 34 of each board is represented in a hexagon directly below the respective board. In this example, the interactive boards are situated from left to right. The index essentially uniquely identifies each interactive board and may be any unique identifier. The physical location or order of the interactive boards may be used to create a different index for each board.

Each interactive board 24 also has an offset (offset value or number). The offset can be any positive integer or zero. The value of the offset corresponds to the number of the panel that an interactive board displays, typically based on or relative to the panel number to which a master board displays. A master board always has an offset of zero. For example, if a master interactive board is set to display panel number "20", then an interactive board with an offset of −2 would display panel number "18."

Figure 3:
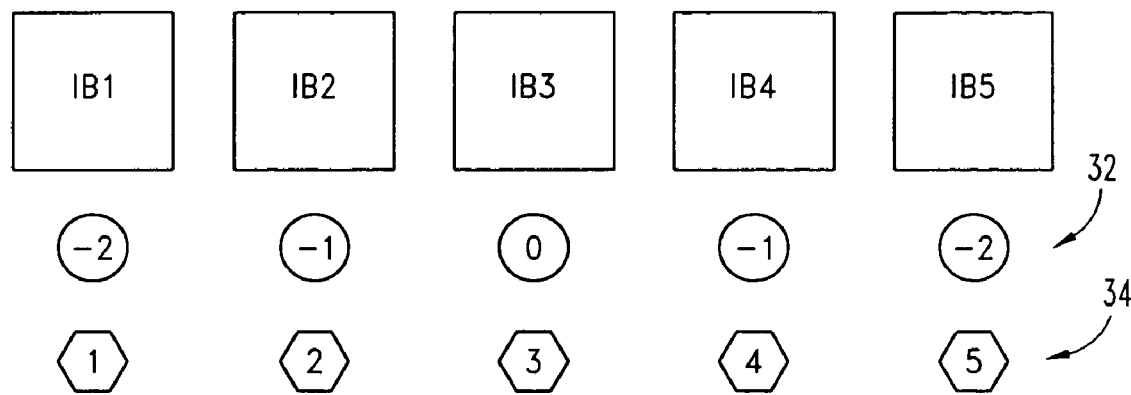
FIG. 3 is a representation of the array of interactive boards illustrating offset and index values therefore in accordance with the principles of the present invention.

In FIG. 3, the offset value is represented by the circled number immediately below an interactive board. Interactive board IB3 is a master board since it has an offset value of "0". The interactive board IB4 immediately adjacent to the right side of interactive board IB3 has an offset value of "−1". Therefore, this interactive board (IB4) will always display a panel that is one panel less than the panel being displayed on the master board 1133. Likewise, the interactive board IB2 immediately adjacent to the left side of interactive board IB3 has an offset value of "−1". Therefore, in one mode (automatic) this interactive board (IB2) will display a panel that is one panel less than the panel being displayed on the master board IB3. Moreover, the interactive board IB5 has an offset value of "−2." Therefore, this interactive board (IB5) will always display a panel that is two panels less than the panel being displayed on the master board IB3. If, however, a master board is displaying panel 0 or 1, for example, any board having an offset of −1 or −2, respectively relative to panel 0 and 1, would default to displaying panel 1 since the −1 and −2 panels do not exist. Moreover, the interactive board IB1 has an offset value of "−2." Therefore, this interactive board (IB1) will always display a panel that is two panels less than the panel being displayed on the master board IB3. It should be appreciated that this is an exemplary offset scheme. Other offset schemes may be utilized. Moreover, this exemplary offset scheme uses only negative offset numbers. Positive offset numbers may be used but may create a condition where a panel greater (or newer) than the panel number being displayed on the master board does not yet exist. In this case, a default condition occurs to display the last panel in the notebook.

The offset number can be changed by the moderator using the master board. The offset number is involved in automating the panel numbers that the non-master interactive boards are displaying. As noted, the moderator may manually adjust the panel that each board is displaying. However, sometimes it is convenient to allow the system to automatically adjust the panels displayed on each non-master board. This is what the offset value, assigned to each interactive board, accomplishes. In keeping with the offset values as depicted in FIG. 3 and additionally referring to FIG. 4, a panel display scheme for the interactive boards will be discussed with respect to panel navigation or a panel change. This scheme may be initiated when a master board changes panels. When a master board changes display of a panel, the master board provides a board synchronization or sync command that is provided to the other interactive boards, as well as any participant devices (see below). This is accomplished through the server 25 via the switch 27. Particularly, and as with all commands, the board sync command is provided to the server 25. The server 25 provides the command in queue for retrieval by the interactive boards and any participant devices. The sync command thus tells the other interactive boards and any participant devices the new panel number of the master board. The other interactive boards and any participant devices then calculates the panel number to which it is to navigate and thus display through its offset and panel number of the master board.

Figure 4:
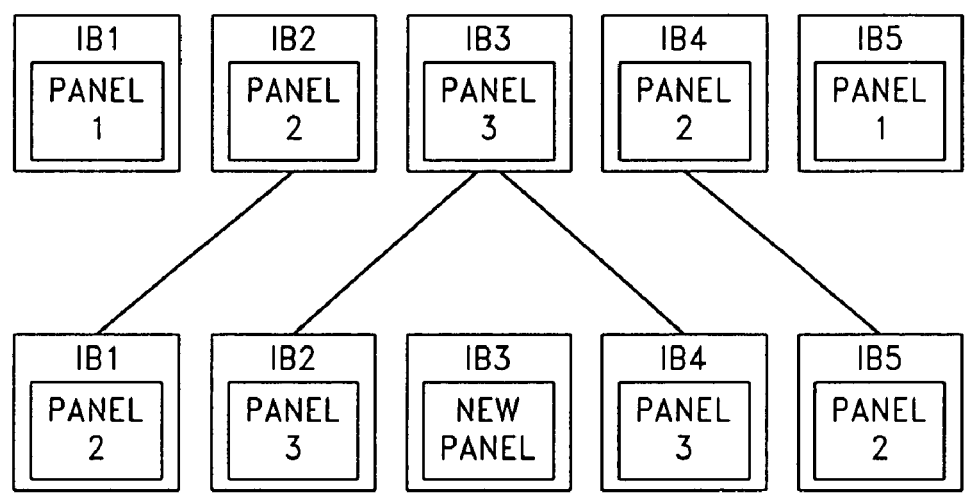
FIG. 4 is a representation of an exemplary manner in which new panels of content are displayed on the array of interactive boards.

In FIGS. 3 and 4, the center board IB3 is the master board meaning that this is the board on which the moderator tends to work on the most (and has an offset of "0"). As the moderator adjusts the number of the panel viewed on the master board, the number of the panel on the other interactive boards will automatically adjust using the scheme that is specified by the offset number of each board. In FIG. 4, the master board (IB3) is displaying panel number "3." As a new panel (e.g. panel "4") is added to the master board, panel "3" is shifted to each interactive board having an offset of "−1." Since interactive boards IB2 and IB4 each have an offset of "−1" they now display panel "3." Since interactive boards IB1 and IB5 each have an offset of "−2," they both now display panel "2." Panel 1 is not displayed. This scheme has the effect of shifting the previous panels to the outside of the center or master board. This is advantageous for large classrooms so that students sitting on the side of the classroom see the previous panels close to them.

It should be noted that if the moderator were to move the center (master) board to panel "1," all of the boards would display panel "1" by default. In other words, when a non-master board (i.e. having an offset that is not "0") computes the panel it should be displaying, if it computes a value less than one for the panel number to be displayed (i.e. a panel that does not exist) it simply displays panel "1." Also note that while changing the panel displayed on the master board causes the non-master boards to adjust the panel they are displaying, the inverse is not true. In other words, if a moderator manually adjusts the panel that is being displayed on a non-master board, the other boards do not adjust automatically.

The offset values of the interactive boards are changeable by the user. Thus, the pattern of panels displayed may be changed by the user as necessary and/or appropriate. In the previous example, we assumed that the center board was the master board and the side boards displayed specific panels based on the panel displayed on the center board. However, various schemes are possible such as a situation in which the user wants the right most board to be the master board. In that case, the offsets of the boards might be assigned by the user as follows: IB1=−4, IB2=−3, IB3=−2, IB2=−1. and IB1=0. Now, if the moderator were to adjust the right-most board to display panel "8," then the board immediately to its left would display panel "7," the next board to the left would display panel "6," and so on. The key is that the pattern that is used can be adjusted by the user based on personal preferences and/or physical classroom size/layout. For example, in one form, the center board is larger in dimension than the side boards that flank the center board. Because of this, most moderators may prefer to think of the center board as the master board.

Another embodiment of the present invention has a so-called pinning feature. When a moderator adjusts the panel that is being displayed on the master board (either by changing the panel directly on that board, or by changing the panel on a walkabout board that has an offset of "0"), the panels on the other boards will adjust according to their offset values. Sometimes, however, it is advantageous for the moderator to be able to "pin" or freeze the display of one or more of the side boards, so that their position does not adjust automatically. This pinning feature may be enabled and disabled as necessary. For example, suppose the moderator has written the "agenda for the day" on one of the non-master boards. The moderator might want this agenda to remain visible during the entire class period so that the moderator can refer back to it. In this case, the moderator can press a "pin icon" to force one or more of the side (non-master) boards to ignore panel change messages from other boards. This pinning feature may be applicable on a participant's input and display device to cause the participant input and display device to remain viewing a particular panel even after a change panel event has occurred.

In accordance with an aspect of the subject invention, and as briefly mentioned above, the multi-board system 20 may optionally additionally incorporate the portable or walkabout input and display (interactive) device or board. Referring back to FIG. 1, the multi-board system 20 is depicted with a portable interactive device 50. The portable interactive device 50 has an index of "0" and an offset of "0." This means that the portable interactive device 50 will send a board sync (synchronization) signal to the session that will be received by the master interactive board when the portable interactive device 50 navigates or scrolls through a panel or panels. As explained further below, a participant or user input and display tablet or workstation will not display a SYNC button for any portable interactive board. Moreover, the offset on the portable interactive device 50 can be set to whichever board 24 the portable interactive device 50 is supposed to mirror.

The portable interactive device 50 may be a Tablet PC, PDA or other device that includes necessary components to accomplish the functions and/or features set forth herein such as having a wireless interface to send or send and receive wireless signals (collectively, the processor/wireless interface 53). The portable interactive device 50 includes an input area/display 52 for receiving content input via a writing tool 54 (see FIG. 6) and to display the received input as well as display the selected panels. The input area 52 may be any type of area that is operable to receive input, such as touch-screen, pen-enabled screen, and the like. Touch screens and pen-enabled screens are both considered touch-sensitive devices as that term is used herein. The portable interactive device 50 runs its own copy or component of the interface program of the multi-board interface programming. As such, the portable interactive device 50 displays the session notebook interface screen such as the exemplary interface screen depicted in FIG. 2.

Examples of the type of portable interactive device 50 that may be used are 1) a Tablet PC notebook computer with a pen-enabled screen running Microsoft Windows XP such as the Acer TravelMate model C300, 2) a video tablet pen-enabled LCD monitor such as the Wacom Cintiq 15x, and 3) or a graphics tablet pen-enabled peripheral input device such as the Wacom Graphire 4×5" graphics tablet. Of course, other types of portable input and display devices or portable PCs may be used.

The portable interactive device 50 is in communication with the server 25 and thus the session running on the server through the switch 27. All communications from the portable interactive device 50 are routed to the session running on the server 25. All communications from any interactive board 24 to the portable interactive device 50 are routed through the session on the server. A preferred communications protocol is as follows. All commands are provided to the server 25 which runs the multi-board software. Appropriate responses are returned to the server 25 from the portable interactive device 50 as necessary. An embodiment of the present invention has been developed in Visual Basic .NET 2003 and VISUAL C# .NET 2003.

Referring back to FIG. 1, the plurality of participant or user input and display (interactive) tablets or workstations 62 will be described. The plurality of interactive tablets 62 are in communication with the server 25 via a bus 60, wireless or other communication medium through the switch 27. As such, the interactive boards communicate with the participant interactive tablets 62 through the server session. Each participant interactive tablet 62 has a processor or processing logic 66 that utilizes multi-machine (session) programming or a component of the multi-machine interface such that each participant tablet 62 is operable to accept input and display panels of the in-session notebook of the moderator. Each participant tablet 62 allows the user to write annotations, graphics, notes, etc., onto a panel or page that, subject to moderator authorization, may be displayed on one of the interactive boards 24 or with respect to a session currently running on the interactive boards 24 but not displayed. Each participant tablet 62 is operable to scroll through the various panels or pages of a session notebook regardless of whether the page or panel is being concurrently displayed on an interactive board 24. A participant device may be one of many types of various devices, such as PDAs, laptops or other computers, electronic tablets, and other interactive devices.

Examples of the type of participant interactive boards 62 that may be used are 1) a Tablet PC notebook computer with a pen-enabled screen running Microsoft Windows XP such as the Acer TravelMate model C300, 2) a video tablet pen-enabled LCD monitor such as the Wacom Cintiq 15x, and 3) a graphics tablet pen-enabled peripheral input device such as the Wacom Graphire 4×5" graphics tablet. Additionally, the participant interactive board 62 may be a laptop or other PC device that is supplied by the participant and is connectable to the bus 60, or wirelessly to the system network. Any such connection may be wired or wireless.

Figure 5:
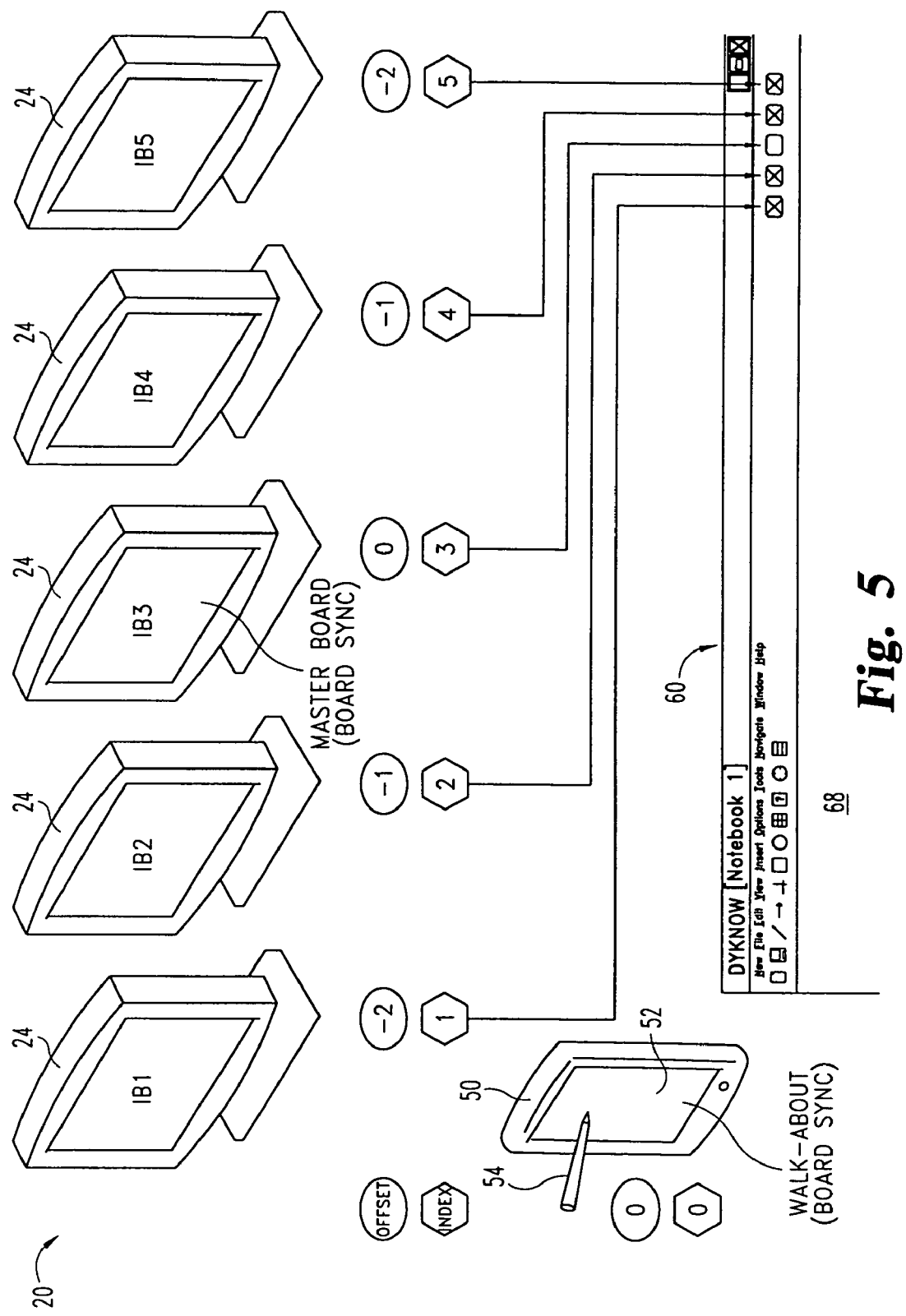
FIG. 5 is a representation of an exemplary manner in which a participant interactive tablet may synchronize their display with the display of any one of the interactive boards.

In accordance with an aspect of the subject invention, each participant interactive tablet 62 is separately operable such that a participant such as a student may operate his/her tablet independent of the other tablets. Moreover, each interactive tablet 62 may synchronize its view with any of the interactive boards 24. Referring to FIG. 5 there is depicted a representation of the system 20 having the five interactive boards as described above illustrating the respective index and offset values assigned to each board. The portable interactive board 50 is also depicted illustrating its index and offset values. A participant interactive tablet 62 is depicted running a participant notebook program 68 of the multi-machine interface. The participant notebook program 68 includes a set of synchronization or sync icons 64 that correspond to the number and position (index) of interactive boards 24. Theses icons 64 appear on each participant's notebook program. There is no sync icon for any portable interactive board since the portable interactive board 50 has an index of zero (0). The sync icons 64 give information about the current synchronization of the participant's display relative to the interactive boards 24. The participant's tablets do not display sync icons for a master board.

When an "X" is displayed on one of these icons 64 it means that the participant's display is not viewing the same panel as the corresponding board (as illustrated by the arrows) is viewing. When one of these icons does not display an "X", it means the participant's display is viewing the same panel as the corresponding board. In FIG. 5 therefore, the participant's display is not showing the same panel as any of the side boards, but only the master or center board. If the participant were to click on the left most icon, then the "X" would disappear and the participant's display would adjust so as to show the panel that is currently showing on the left most board 24. The pattern of "X's" on the icons 64 would adjust accordingly.

Note that it is possible for the pattern of "X's" to indicate that the participant is simultaneously viewing multiple boards. For example, suppose the moderator places board IB1 on panel 1, board IB2 also on panel 1, board IB3 on panel 2, board IB4 on panel 1, and board IB5 on panel 2. If the participant then is displaying panel 1 on the tablet 60, then the participant's icons would show "X's" only on the third and fifth icons.

Because each participant interactive tablet 62 runs it own copy of the present multi-board software, each participant's version of a session notebook, including a participant's notes written onto the panels can be stored locally (i.e. on a disk or hard drive), or stored on the server 25.

Figure 6:
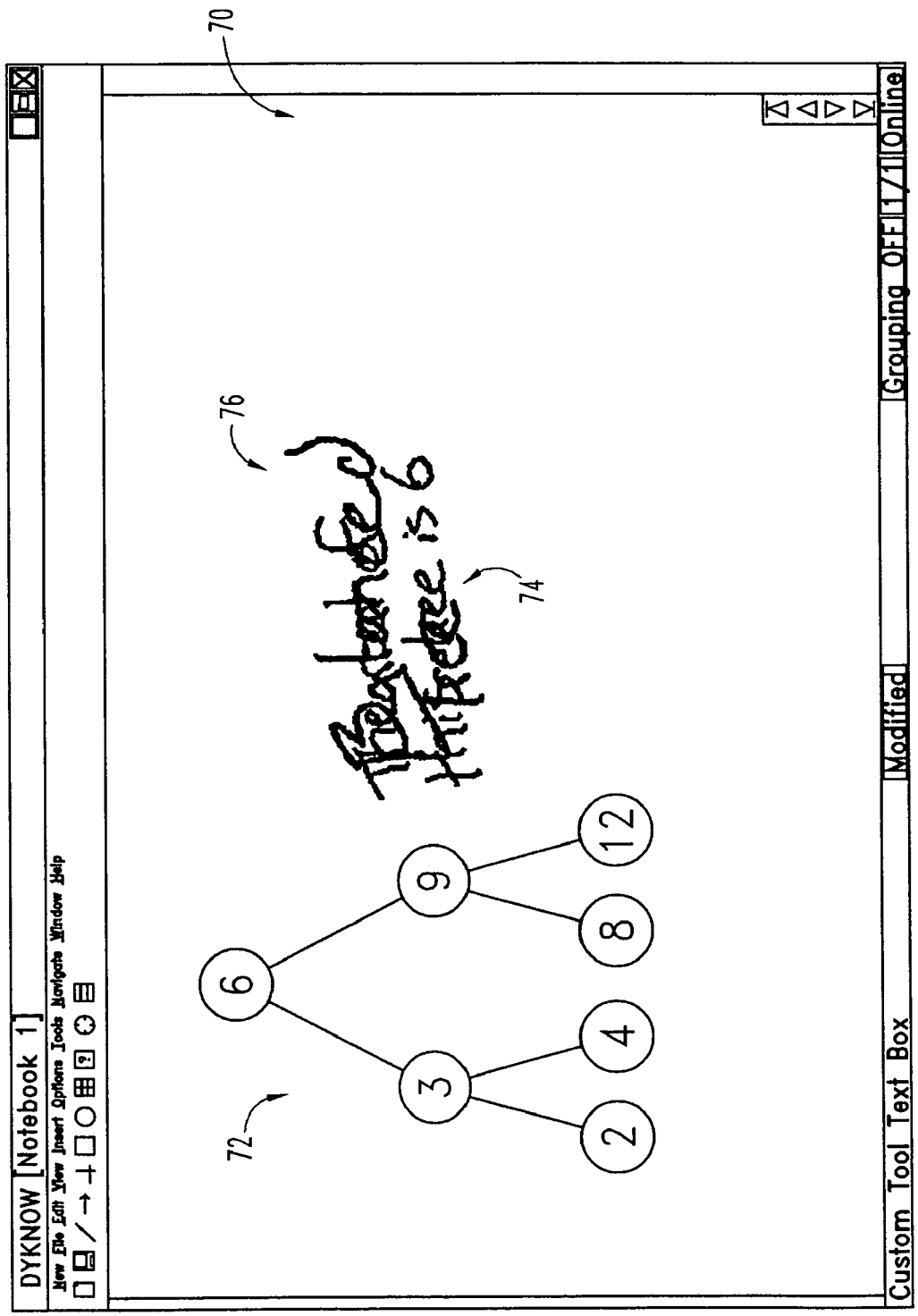
FIG. 6 is a screen of an exemplary panel displayed on an interactive board depicting a case in which there has been a collision between a moderator's content input and a participant's content input.

As indicated above, the participant is able to provide content input onto their interactive tablet 62, particularly over, onto or around the moderator content being displayed on a particular panel. The problem of collisions may occur between the moderator content and the participant content. To make the collision problem concrete, consider a situation in which the moderator draws a diagram on the left side of a panel on one of the interactive boards 24. Referring to FIG. 6, there is depicted a screen shot on an interactive board 24. The moderator content 72 (i.e. diagram) is shown as drawn by the moderator while stating "This is a balanced tree." Suppose that one of the participants chooses to write the words "Balanced Tree" (provide user content 76) just to the right of the diagram 72. If the moderator now writes "The root of the tree is 6" (moderator content 74) so that it is also written just to the right of the diagram 72, the moderator's writing will collide with the participant's private annotations.

Because of the collision problem, the present invention provides a collision avoidance technique known as shadowed or masked feedback. This technique is based on the realization that the lack of moderator awareness of user drawing actions is at the center of the collision problem. The goal of shadowed feedback is to increase the moderator's awareness by having all participant private annotations (participant content drawn on the participant interactive tablets 6s) transmitted back to the moderator's display in a light customizable color. In order to maintain privacy, these private annotations are distorted, masked or shadowed in a manner that renders all hand-written, hand-drawn and type-written text unreadable while preserving position of the participant content. These distorted object or objects are called shadows or masks since they show the shape and location of the private annotations but lack the details of the original annotations, thus the terminology shadowing, masking, obscuring or the like.

Providing shadowed feedback for typed text is accomplished by positioning a horizontal line greater in size to the typed text over the typed text. Handwritten text is shadowed by positioning a thicker horizontal line over the handwritten text. This has the effect of blending individual pen strokes together thus rendering the text unreadable. When implemented, a shadow is preferably not placed over the original object on the display. Instead, the original object is preferably replaced by the shadow. As an alternative, one could also place the shadow over the object.

Figure 7:
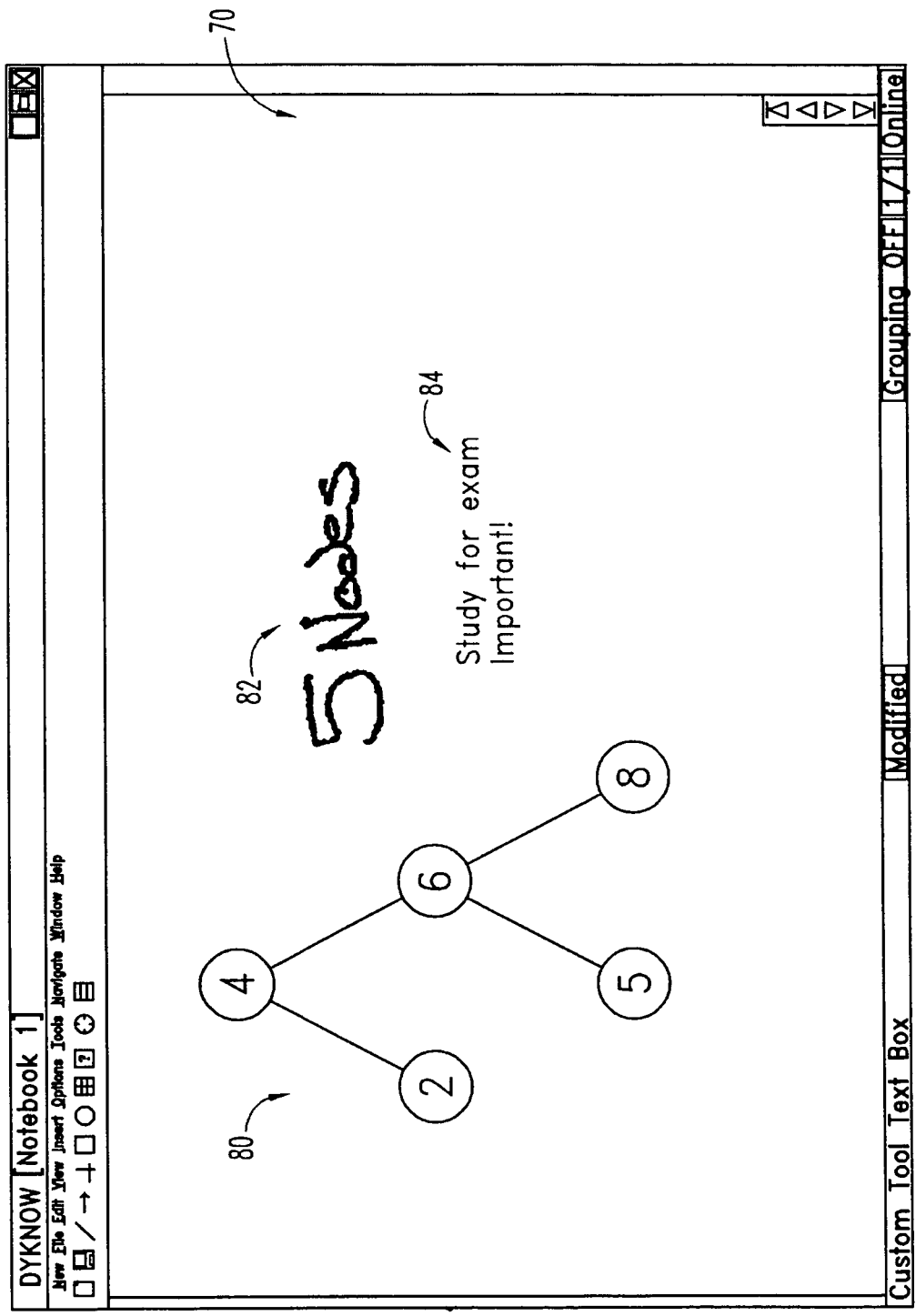
FIG. 7 is a screen of an exemplary panel displayed on an interactive board depicting moderator content and user content.

FIG. 7 depicts a screen shot in which a binary tree 80 drawn by the moderator is shown on a particular panel. To the right of the diagram 80, one participant has made the handwritten private annotation 82 of "5 Nodes" on their tablet 60, while another participant has made a typewritten private annotation 84 of "Study for exam" and "Important!" on their tablet 60.

Figure 8:
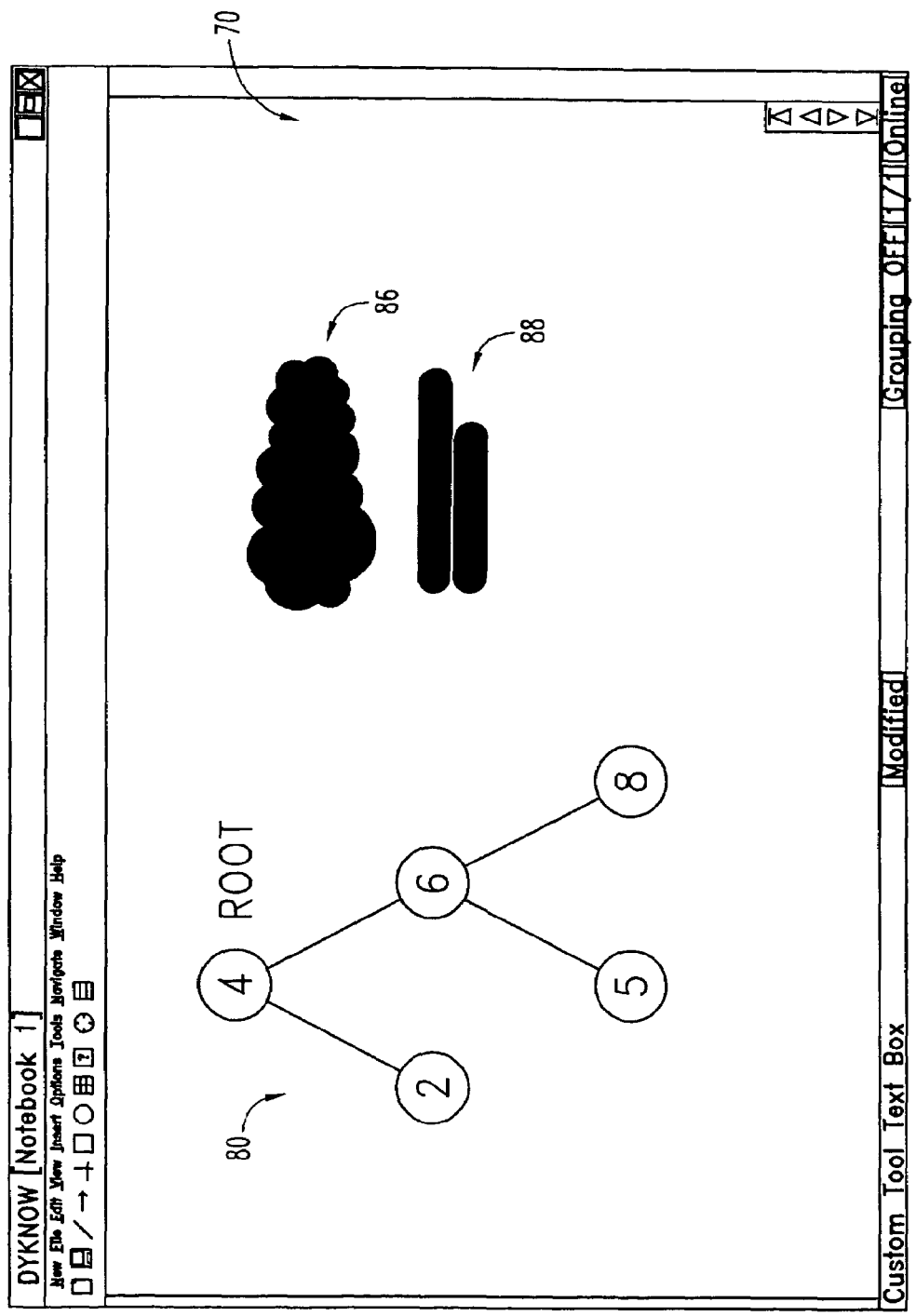
FIG. 8 is a screen shot of the panel of FIG. 8 in which masking has been enabled.

FIG. 8 depicts the interactive board after the private annotations are distorted, obscured, masked and drawn as shadows. Particularly, shadow or mask 86 distorts or obscures the private annotation 82 while the shadow or mask 88 distorts or obscures the private annotation 84. This manner of shadowing may be termed full shadowing. The color and/or darkness of the shadows may be adjusted as necessary. A dialog box, accessible from the moderator notebook program, may be provided that allows the moderator to designate the relative lightness or darkness of the shadows, and may vary the line thickness for freehand shadows. The moderator may be provided with the ability to disable shadowing altogether or to view only the shadows and nothing else.

Another version of the present shadowing may be termed rectangle shadow version. In this version, only a rectangle tool is provided. The rectangle tool allows the participant to create a space or area for private annotations. This area is then transmitted back to the moderator. Other shapes may be used. This allows for a "reservation" of space on which to write or provide private annotations. The rectangular region is displayed as a light color on the moderator board. Any private annotations made within the reserved space are not displayed.

Another attribute of shadowing involves providing each device with a third attribute (in addition to the attribute of index and offset) termed shadow status. Shadow status may be enabled or disabled by the user. Shadow status may be assigned a value of either "0" or "1." When shadow status has the value "0" for a specific device, that device does not display shadows of the participants work. If shadow status has the value of "1," however, participant shadows are displayed. For example, the moderator might set the shadow status to be "0" on each of the interactive boards at the front of the room, while setting the shadow status to be "1" on the walkabout board. In this way the moderator can see the shadows by looking at the walkabout board; however, the participants cannot see shadows by looking at the front boards.

The present information system also incorporates a private ink feature or function. Private ink is content drawn by the moderator on a panel (either on the walkabout board or an interactive board) during a session. This private ink will not be transmitted to the participant's tablets. Private ink can thus be used to force participants to copy material from the board if the moderator deems that this is an important thing for the participants to do. For example, the moderator might draw a Japanese Kanji character on the front interactive board with the intention that the participants struggle to copy this manually into their notes because the act of doing the copying is part of the learning process. With respect to the multi-boards and portable board, suppose the moderator draws private ink on board 1 which is displaying panel 1. This private ink will be displayed on any other board or machine displaying panel 1, but still will not be displayed on the participant's tablets. Conversely, private ink drawn on panel 1 on the walkabout board 50 will be displayed on any board when it displays panel 1, but again not on the participant's tablets.

The moderator may control the color that the shadows should appear on the moderator display. This may be termed SHADOW_COLOR. The moderator may also set the thickness of the shadows that pen objects will be drawn on the moderator's display. This may be termed SHADOW_THICKNESS. Drawing the pen-strokes with increased thickness tends to make the resulting text less readable, therefore ensuring that the moderator sees a shadow of the participant's free-hand text (pen-drawn) rather than being able to read the actual free hand text. As well, the moderator can turn shadowing ON or OFF (SHADOW_ENABLE). Each of these settings may be accomplished on a master multi-board or on a portable device. These can operate independently. For example, the moderator might opt to see shadows only on a portable board, but not the display thereof on any of the interactive boards.

With respect to the full shadowing version, when a participant adds any object (various tools of the participant software) other than an eraser object, the participant tablet sends a flagged copy of the new object via the server to each moderator version of the multi-board software. The flag is used to indicate that this is a shadow object. The moderator version of the multi-board software receives an object with shadow flag set. An example algorithm for full shadowing is:
If SHADOW-ENABLE is ON Then
If the Object is Typed Text or a Graphic Image
Replace the object by solid rectangular region the same shape as the text or graphic.
EndIf
If the object is freehand Ink
Increase the thickness of the object to the level indicated by
the SHADOW_THICKNESS variable.
EndIf
Convert the color/brightness of the object to SHADOW_COLOR
Draw Shadowed Version of the Object on the Moderator Display
EndIf With respect to the rectangle shadowing version, when a participant adds a special rectangle object called a shadow object to the in session notebook, the participant version of the multi-board software sends this special object to each moderator via the server. The object has a special object type that conveys that this object is a shadow object. The moderator version of the multi-board software thus receives a special shadow object. An example algorithm for displaying a shadow object under the rectangle shadowing paradigm is:
If SHADOW_ENABLE ON Then
Convert the color/brightness of the object to SHADOW_COLOR
Draw the Object on the Moderator Display
EndIf A session begins by a moderator operating on a master board initiating a particular session notebook. Using the configuration of interactive boards of FIG. 1, the master board IB3 (i.e. having an offset of 0 and an index of 3 with a nomenclature of [0,3]) sends a board configuration command to the server 25 via its computer C3. This command is held in queue in the server 25. Thereafter, interactive board IB1, having an offset/index of [−2,1] joins in the session and sends a board configuration command to the server 25 indicating same. The other interactive boards likewise join the session and send respective board configuration commands to the server.

Any participants 62 then joining the session receive all five (5) board configuration commands from the server 25 (session). The participant device generates five SYNC buttons for display based on the five board configuration commands indicating that there are five (5) boards. The master board IB3 [0,3] navigates to a panel having a panel number and a board sync command is forwarded to the server 25. The board sync command is then received by the participant workstations and other interactive boards. Each interactive board changes panels accordingly and essentially concurrently. Particularly, the various non-master interactive boards navigate or change panels in the following manner given that the master interactive board receives a command to display panel number "6" and given the offset values as depicted in FIGS. 3 and 4: interactive board IB1 [−2,1] receives a board sync command and displays panel number "4" (Board-sync {6}+Offset {−2}); interactive board IB2 [−1,2] receives a board sync command and displays panel number "5" (Board-sync {6}+Offset {−1}); interactive board IB4 [−1,4] receives a board sync command and displays panel number "5" (Board-sync {6}+Offset {−2}); while interactive board IB5 [−2,5] receives a board sync command and displays panel number "4" (Board-sync {6}+Offset {−2}).

The participant workstations initially navigate to the panel of the master board, while the other interactive boards navigate to the panel determined by the offset number and the panel number being displayed on the master board. If a panel number does not exist after calculation of what panel to display, a default display of the same panel may be provided. The status of their sync buttons based on the panel on which they are currently displaying is also updated. Each participant may also enable pinning with respect to his/her participant interactive device. Particularly, each participant interactive device may pin a panel wherein the particular panel being displayed on the participant interactive device does not change when a panel change is received. Pinning may be disabled at any time wherein the panel being displayed on the participant interactive device does change when a panel change is received, such as from a session running on the server.

FIG. 9 depicts an exemplary screen of an interactive multi-board 24 when the interactive multi-board is in a configuration input and session launch mode. Particularly, the screen of FIG. 9 depicts an input screen or dialog box for inputting configuration data for the multi-board system via an interactive multi-board 24, such as a master interactive multi-board, and launching a session. The screen includes a Sign On section, a Communications Configuration section, a Launch section and a Board Configuration section. The Sign On section allows the moderator to sign on to the particular interactive multi-board. The Communications Configuration section allows the moderator to select and change communication parameters, the Launch section allows the moderator to begin a session with the other interactive devices of the present multi-board system 20. The Board Configuration section is shown and allows the moderator to select and change multi-board parameters.

The Board Configuration section allows the input and control of twelve (12) interactive boards, which number may be higher if necessary. With the system as shown, there are five (5) interactive boards. The screen indicates whether a particular interactive board is in use via the "In Use" box adjacent the board order. The board order may provide the board's index. The board allows input and display of the board controller/computer (e.g. C1-C5) address. The system is preferably configured to allow communications over the Internet, or any IP-based network, and the IP (Internet protocol) address or the workstation name (if DNS, Domain Name Server, is available) of each board computer is accordingly specified in the address block of the Board Configuration screen shown in FIG. 9. Additionally, the screen indicates and allows selection of master interactive boards. Moreover, an interactive board's offset is indicated and selectable. The program enables the offset of each board to be established via this dialog box through a selected board computer, e.g., the computer for the board selected to be the master board. An Apply Changes box saves the selected Board Configuration. The multi-board computers are programmed in one embodiment to enable automatic launch of the multi-board programs in the non-master computers in response to launch of the master board program.

Figure 10:
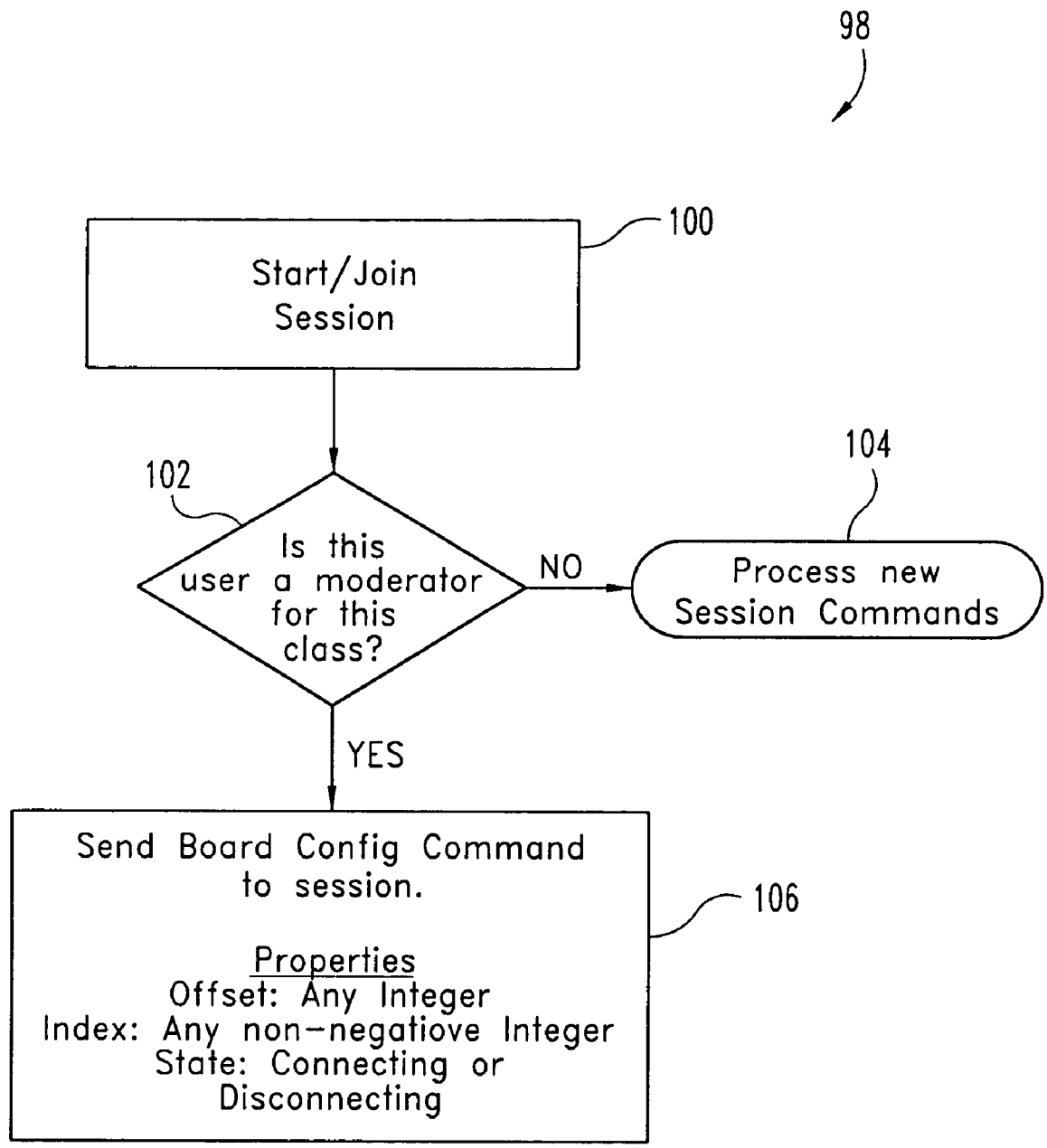
FIG. 10 is a flowchart of a portion of the multi-board software in accordance with the principles of the subject invention, particularly relating to a manner in which an interactive device of the present interactive input and display system starts or joins a session.

In FIG. 10 a flowchart, generally designated 98, is shown representing a portion of the multi-board software of the present system relating to an exemplary manner or method of session initiation for an interactive device (e.g. and collectively, a multi-board 24, a portable device 50 or a participant device) of the present multi-board system 20. In step 100, a start or join session command initiated on an interactive device launches at least a component or a device adapted version of the present multi-board program operating on the interactive device. In step 102, the program determines whether the interactive device seeking to start or join a multi-board session is being launched as a moderator or as a participant. This determination may be accomplished by ascertaining the value of a database field representing whether the user of the interactive device is a moderator or participant. Such determination is returned to the server as part of the original participant interactive device poll and is confirmed by the session as part of the start/join session command.

In step 102, if the interactive device is determined to be a participant device (hence, NO to the question of step 102), then the participant device begins to process new session commands as it receives those commands from the server as represented by step 104. If, however, in step 102 it is determined that the interactive device is a moderator device (hence, YES to the question of step 102), then a Board Configuration (Config) Command, step 106, is sent to the session (i.e. to a server or other computer (collectively, server) running the session). A Board Configuration Command includes data regarding the properties of the particular interactive board (moderator) requesting/seeking to join or start the session. Particularly, the Board Configuration Command includes offset data for the particular interactive board (i.e. the assigned offset integer), index data for the particular interactive board (i.e. the assigned index non-negative integer) and the state of the particular interactive board (i.e. whether connecting to a session or disconnecting from a session).

Figure 11:
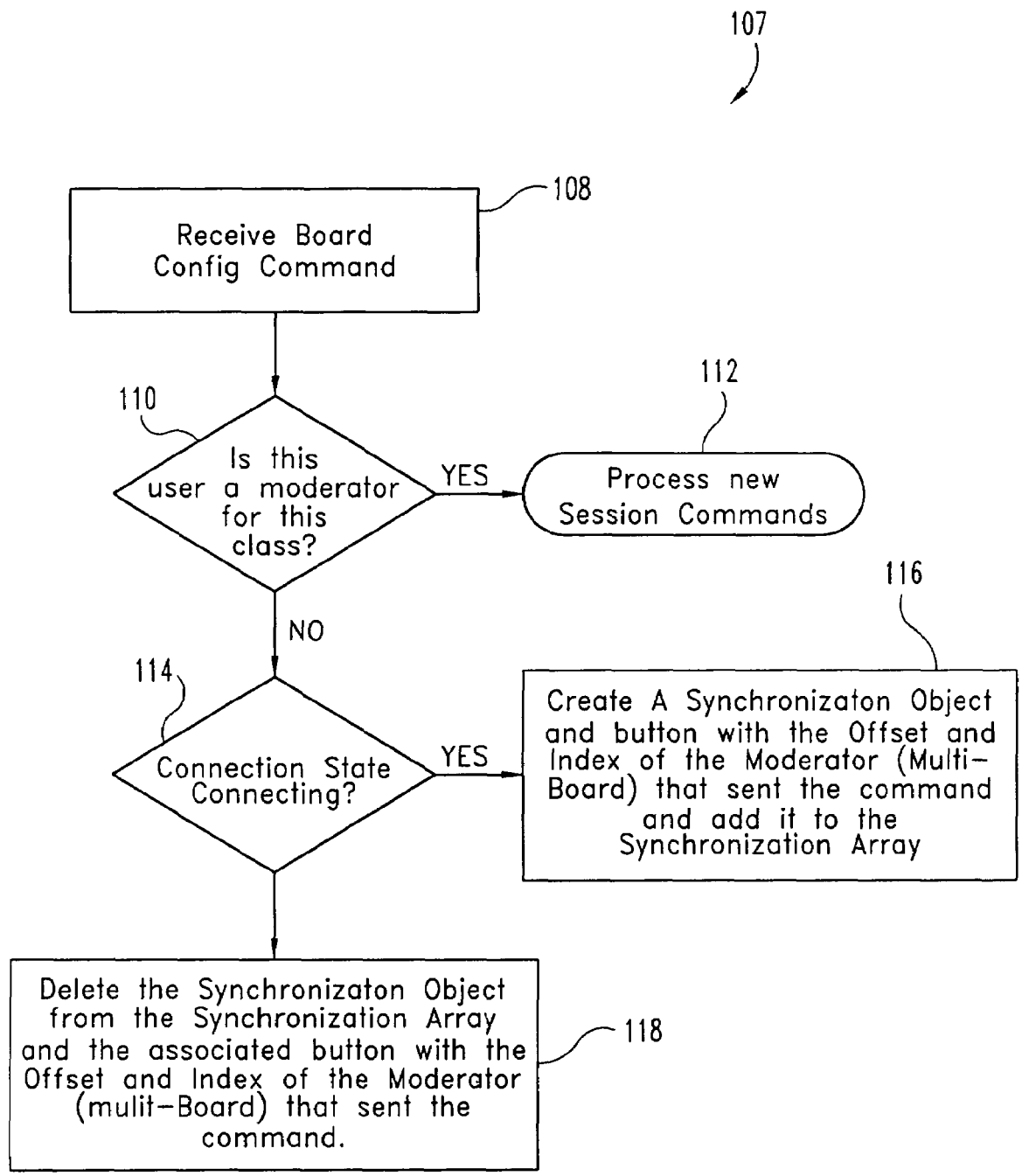
FIG. 11 is a flowchart of a portion of the multi-board software in accordance with the principles of the subject invention, particularly relating to a manner in which a participant display (machine) processes a received Board Config command.

In FIG. 11 a flowchart, generally designated 107, is shown representing a portion of the multi-board software of the present invention relating to an exemplary manner or method of server session data receipt and processing of a Board Sync command. This exemplary manner may flow from the previous flowchart 98. In step 108 of flowchart 107, the interactive display receives a Board Configuration Command from a moderator device via the session server (see e.g. flowchart 98). In step 110 it is determined whether the device trying to provide session data is a moderator. If the interactive device is a moderator (YES), the Board Config command is ignored and new session commands are processed as provided in step 112. If the device trying to provide session data is not a moderator (i.e. NO) then the interactive device is a participant and program flow proceeds to step 114 regarding processing of the Board Config command.

In step 114, the connection state is determined. If the connection state is Connecting (i.e. YES), a Synchronization Object for the moderator (interactive device) that sent the Board Config command and an associated sync button are created. The Offset and Index of the sending moderator are associated with the sync button. Various other data may be associated with the sync button or Synchronization Object. The Synchronization Object and sync button is added to the Synchronization Array for the session and accessed as appropriate. If the connection status or state is Disconnecting (i.e. NO), then in step 118 the Synchronization Object (previously created for the participant) and the associated sync button are deleted from the Synchronization Array for the moderator that sent the command via the session server.

Figure 12:
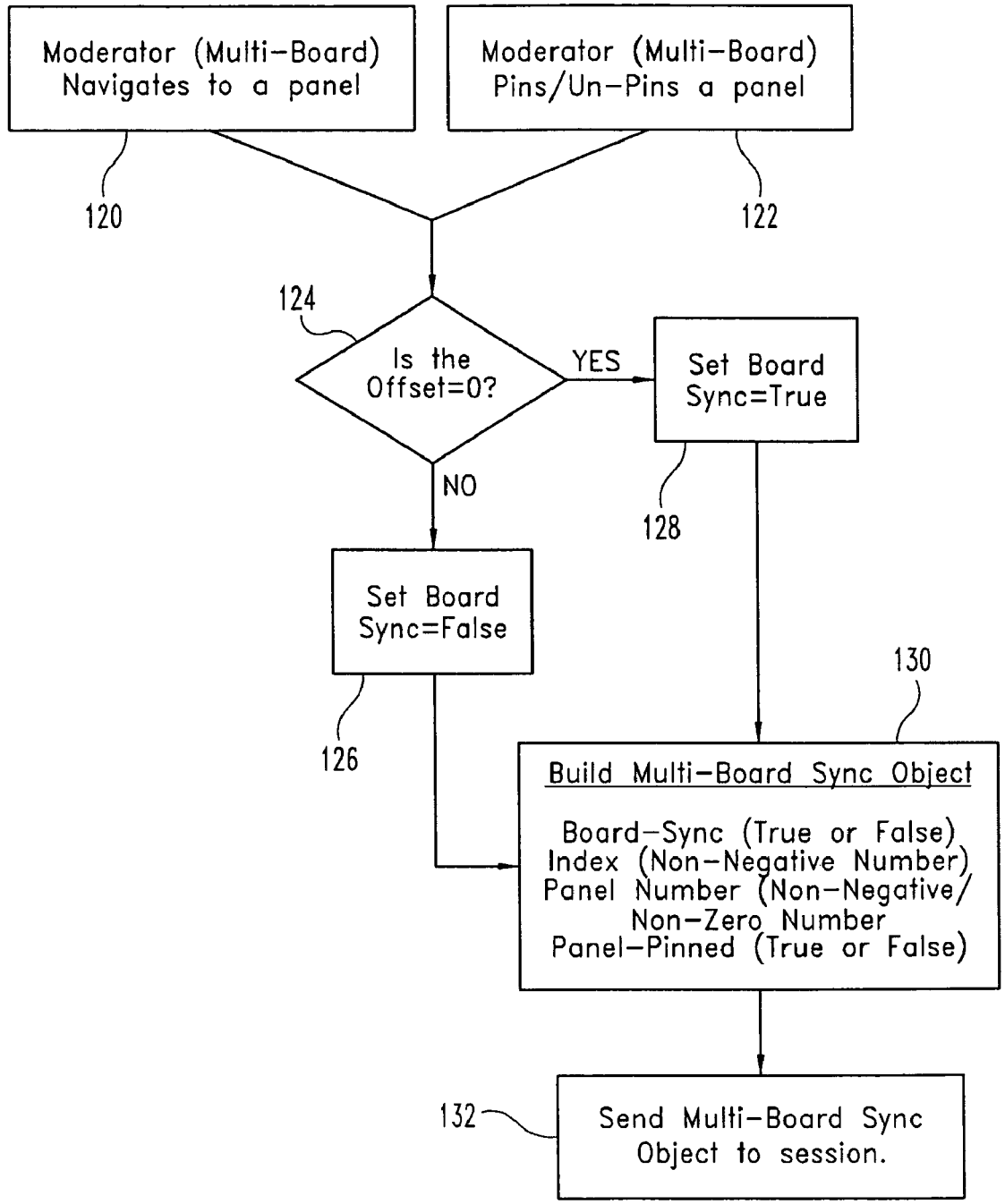
FIG. 12 is a flowchart of a portion of the multi-board software in accordance with the principles of the subject invention, particularly relating to a manner in which a moderator interactive device creates a Multi-Board Sync Object when either navigation or pin event has occurred on that device and sends that sync object to the session server.

In FIG. 12 a flowchart, generally designated 119, is shown representing a portion of the multi-board software of the present invention relating to an exemplary manner or method of panel navigation by a moderator interactive board or device. This exemplary manner may flow from the previous flowchart(s) 98, 107. In step 120, a moderator interactive board navigates, switches or changes to a panel. This navigation generates navigation data. Additionally, a moderator interactive board may Pin or Un-pin an interactive board at any time, thereby generating Pin/Un-pin data (represented in FIG. 13 as step or box 122).

In step 124, the interactive board programming determines whether the Offset (offset value or number) of the generated navigation data/command(s) is zero (0). If the offset is not zero (i.e. NO), then in step 126 Board-Sync is set to False. If the Offset is zero (i.e. YES), then in step 128, Board-Sync is set to True. This process provides data to allow interactive devices with a non-zero offset to change panels relative to a changed panel From either event, in step 130 a Multi-Board (Interactive Device) Sync Object is built. The Multi-Board Sync Object includes data regarding whether the Board Sync is True or False, the Index (index value), the Panel Number navigated to, and whether the panels is pinned or not (Panel-Pinned=True or Panel-Pinned=False). Thereafter, in step 132, the Multi-Board Sync Object is sent to the session server.

Figure 13:
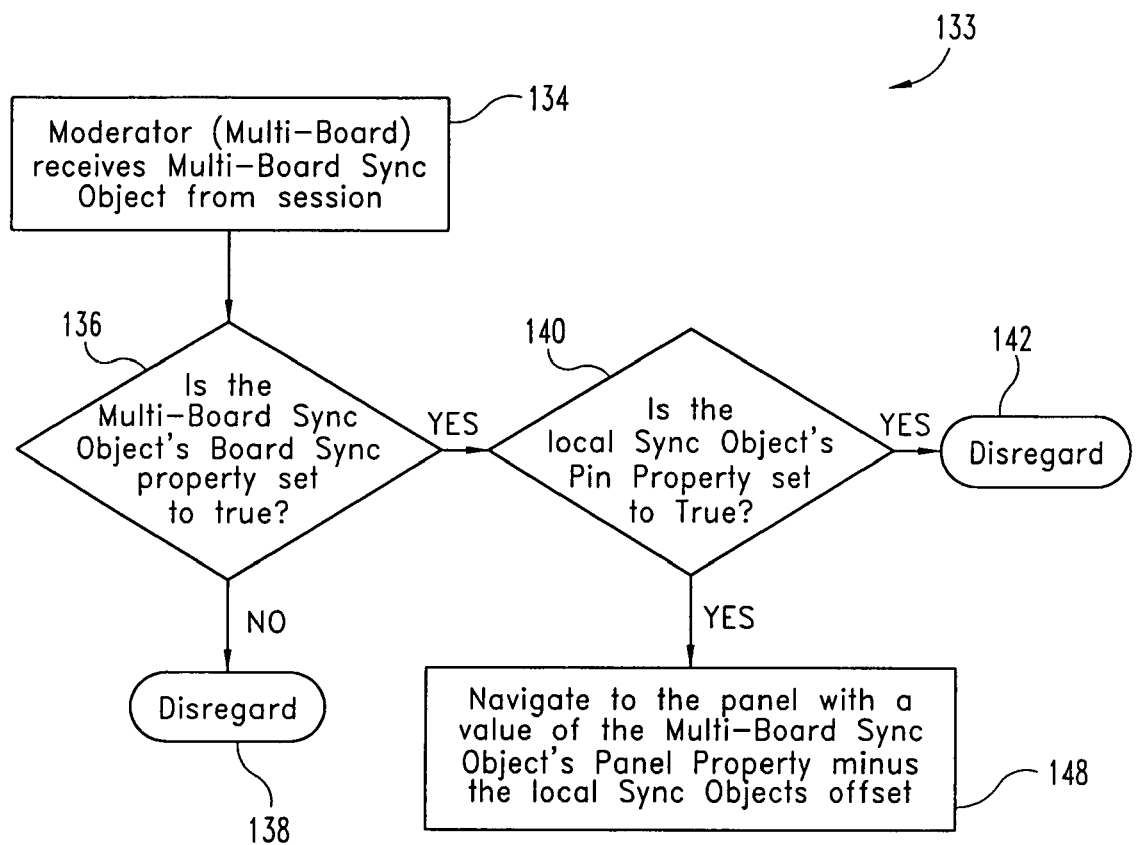
FIG. 13 is a flowchart of a portion of the multi-board software in accordance with the principles of the subject invention, particularly relating to a manner in which a moderator interactive device receives and processes a Multi-Board Sync object from the session server.

In FIG. 13 a flowchart, generally designated 133, is shown representing a portion of the multi-board software of the present invention relating to an exemplary manner or method of moderator device navigation relative to receiving a Multi-Board Sync object. This exemplary manner may flow from the previous flowchart(s) 98, 107 and 119. In step 134, an interactive device or board receives a Multi-Board Sync Object from the session server. In step 136 it is determined whether the Board Sync property/data of the received Multi-Board Sync Object is set to True. If the Board Sync property is not set to True (i.e. NO or the Offset is 0), then processing flows to step 138 wherein the command/data is disregarded. This is because the interactive board receiving the command/data is a board that does not navigate or change its panel display with respect to panel display on any other board (hence an Offset of 0).

If the Board Sync property is set to True (i.e. YES or the Offset), then processing flows to step 140. This is because the interactive board receiving the command/data does navigate or change its panel display with respect to a panel display on another board (hence the non-zero Offset). In step 140 it is determined whether the Pin property of the Multi-Board Sync Object is set to True. If the Pin property is set to True (and therefore the board is pinned) flow proceeds to step 142 where the command/data is disregarded. This is because Pinning is active and thus the board has been told to freeze its display on the currently displayed pane. If the Pin property is set to False (and therefore the board is not pinned) flow proceeds to step 144 where the board navigates to the panel as determined by the data (panel number) of the Multi-Board Sync Object data plus the Offset number.

Figure 14:
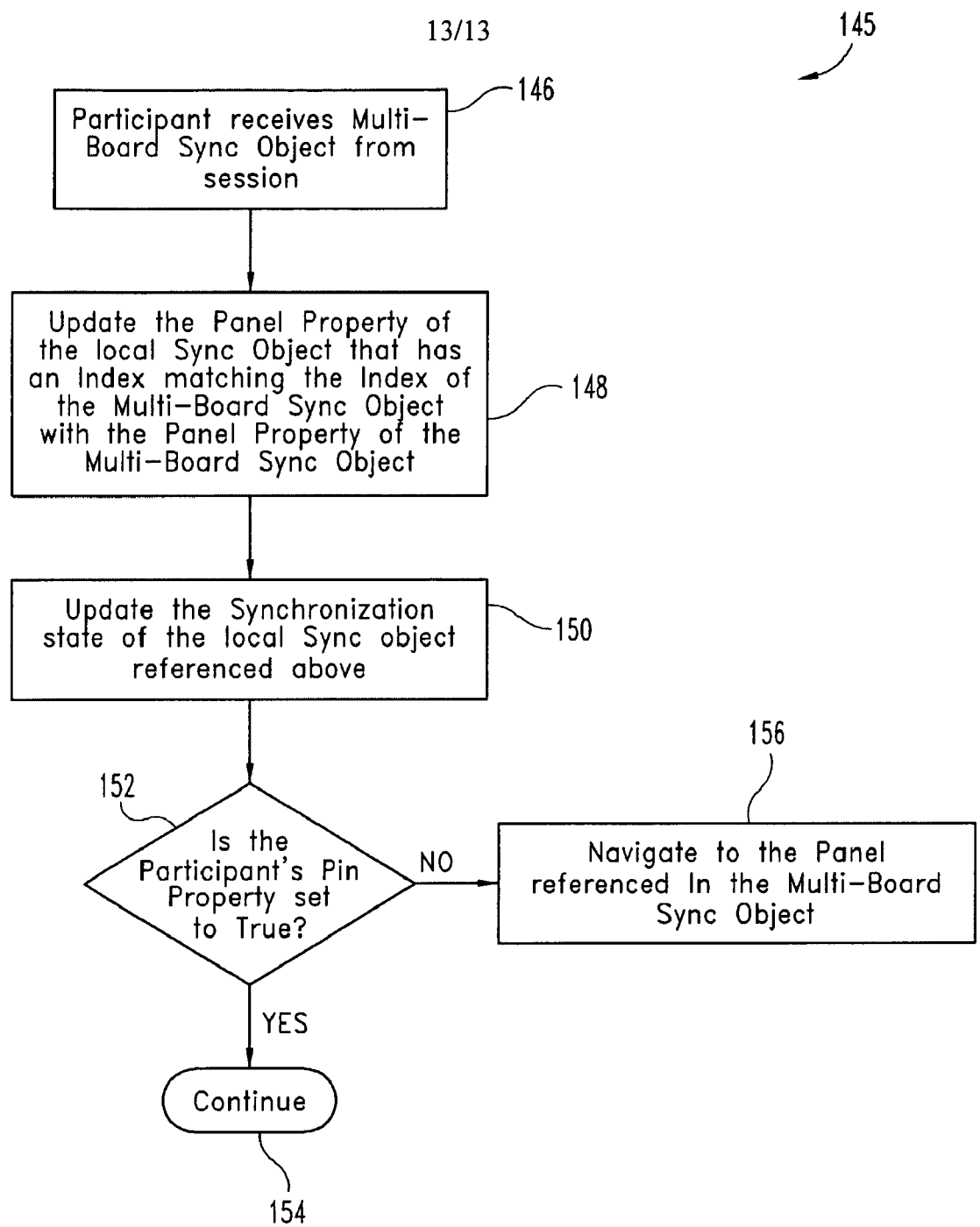
FIG. 14 is a flowchart of a portion of the multi-board software in accordance with the principles of the subject invention, particularly relating to a manner in which a participant interactive device receives and processes a Multi-Board Sync object from the session server.

In FIG. 14 a flowchart, generally designated 145, is shown representing a portion of the multi-board software of the present invention relating to an exemplary manner or method of participant device navigation relative to receiving a Multi-board Sync object. This exemplary manner may flow from the previous flowcharts, 98, 107, 119 and 133. In step 146 the participant device receives a Multi-Board Sync Object. In step 148, the participate updates its Panel Property of a Local Sync Object that has an Index matching the Index of the Multi-Board Sync Object with the Panel Property. In step 150, the Synchronization state of the participant device is updated (i.e. the synchronization icons and related data are updated).

Thereafter, in step 152 it is determined whether the participant's PIN property is set to True. If True, then processing continues, step 154. If False, then the participant device navigates to the panel referenced in the Multi-Board Sync Object.

While the invention has been illustrated and described in detail in the drawings and foregoing description, the same is to be considered as illustrative and not restrictive in character, it being understood that only preferred embodiments has been shown and described and that all changes and modifications that come within the spirit of the invention are desired to be protected.

What is claimed is:

1. A presentation system comprising:
a plurality of computer-enabled display devices each one of which is adapted to execute multi-board programming allowing designation of a master computer-enabled display device from the plurality of computer-enabled display devices, the master computer-enabled display device defining a reference panel from which other computer-enabled display devices determine a panel to display; and
a server in communication with each one of the plurality of computer-enabled display devices and adapted to execute the multi-board programming to provide a multi-board session operable to receive and disseminate commands and session data to and from the plurality of computer-enabled display devices;
wherein the master computer-enabled display device is configured to accept input relative to one or more panels of a session notebook, and to control display of any one of the panels of the session notebook on any one or more of the plurality of computer-enabled display devices; and
wherein each one of the plurality of computer-enabled display devices is assigned an offset value, the offset value of each computer-enabled display device determining a panel of the one or more panels of the session notebook to display on each one of the computer-enabled display devices board relative to a panel of the session notebook being displayed on the master computer-enabled display device.

2. The presentation system of claim 1, wherein the offset value causes each computer-enabled display device to automatically display a particular panel of the session notebook relative to a change in the panel of the session notebook being displayed on the master computer-enabled display device.

3. The presentation system of claim 2, wherein the offset value of each computer-enabled display device is selectable by a user.

4. The presentation system of claim 3, wherein panel display configuration relative to the plurality of computer-enabled display devices is selectable by the user via user selection of offset.

5. A presentation system comprising:
a plurality of computer-enabled interactive boards each one of which is adapted to execute multi-board programming allowing designation of a master computer-enabled interactive board from the plurality of computer-enabled interactive boards, the master computer-enabled interactive board defining a reference panel from which other computer-enabled interactive boards determine a panel to display;
a server in communication with each one of the plurality of computer-enabled interactive boards and adapted to execute the multi-board programming to provide a multi-board session operable to receive and disseminate commands and session data to and from the plurality of computer-enabled interactive boards; and
a portable computer-enabled interactive device in mutual communication with the server and configured to control display of each one of the plurality of computer-enabled interactive boards;
wherein the portable computer-enabled device is further configured to accept content input relative to one or more panels of a session notebook and to display the one or more panels of the session notebook on any one or more of the plurality of computer-enabled interactive boards; and
wherein each one of the plurality of computer-enabled interactive boards is assigned an offset value, the offset value of each computer-enabled interactive board determining a panel of the session notebook of the one or more panels of the session notebook to display on each one of the computer controlled interactive boards relative to a content panel of the session notebook being displayed on the portable computer-enabled interactive device.

6. The presentation system of claim 5, wherein the offset value causes each computer-enabled interactive board to automatically display a particular panel of the session notebook relative to a change in the panel of the session notebook being displayed on the portable computer-enabled interactive device.

7. The presentation system of claim 6, wherein the offset value of each computer-enabled interactive board is selectable by a user.

8. The presentation system of claim 7, wherein panel display configuration relative to the plurality of computer-enabled display devices is selectable by the user via user selection of offset.

9. A presentation system comprising:
a server;
a plurality of computer-enabled interactive boards including a master computer-enabled interactive board each one of which is in communication with the server; and
an interactive video tablet in communication with the server;
the master computer-enabled interactive board operable to accept input as panels of a session notebook and to control display of the panels of the session notebook on any one of the plurality of computer-enabled interactive boards relative to a panel displayed on the master computer-enabled interactive board, the server configured to allow the electronic video tablet to view any panel of the session notebook as displayed on any one of the plurality of computer-enabled interactive boards.

10. The presentation system of claim 9, further comprising a plurality of interactive video devices each one in communication with the server; and
wherein the server is configured to allow each interactive video device to view any panel of the session notebook as displayed on any one of the plurality of computer-enabled interactive boards.

11. The presentation system of claim 9, wherein the server is further configured to allow the interactive video device to synchronize its view of a panel of the session notebook relative to a display of a panel of the session notebook on any one of the plurality of computer-enabled interactive boards.

12. The presentation system of claim 11, wherein the server is configured to enable an icon representing each one of the plurality of computer-enabled interactive boards on the interactive video device, the icon allowing a participant of the interactive video device to synchronize its display of a panel of the session notebook relative to the display of a panel of the session notebook of any one of the plurality of computer-enabled interactive boards.

* * * * *

UNITED STATES PATENT AND TRADEMARK OFFICE
CERTIFICATE OF CORRECTION

| | | |
|---|---|---|
| PATENT NO. | : 7,508,354 B1 | Page 1 of 1 |
| APPLICATION NO. | : 11/017400 | |
| DATED | : March 24, 2009 | |
| INVENTOR(S) | : Daniel P. Sanders et al. | |

It is certified that error appears in the above-identified patent and that said Letters Patent is hereby corrected as shown below:

On the title page, item [75]:

Inventors: delete "David Berque."

Signed and Sealed this

Second Day of June, 2009

JOHN DOLL
*Acting Director of the United States Patent and Trademark Office*